United States Patent Office 3,257,479
Patented June 21, 1966

3,257,479
AMINO-DI-ALKYLENE PHOSPHONIC ACID ESTERS
Riyad R. Irani, Florissant, and Kurt Moedritzer, Webster Groves, Mo., assignors to Monsanto Company, a corporation of Delaware
No Drawing. Filed Dec. 3, 1962, Ser. No. 241,562
7 Claims. (Cl. 260—932)

This invention relates to organic compounds of phosphorus.

This application is a continuation-in-part of applications, S.N. 152,048, filed November 13, 1961, and S.N. 217,276, filed August 16, 1962.

An object of this invention is to provide new and useful organic compounds of phosphorus containing a

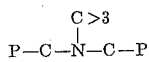

linkage in their molecules.

A further object of this invention is to provide new and useful organic compounds of phosphorus containing a

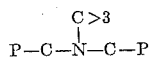

linkage in their molecules with the C>3 group being a hydrophobic and/or lipophilic group.

A further object of this invention is to provide new and useful organophosphonic acids, as well as their salts and esters.

A more specific object of this invention is to provide new and useful organo-amino-di-alkylene phosphonic acids or the salts thereof which exhibit, among other things, combined surfactancy and deflocculating properties.

A more specific object of this invention is to provide new and useful organo-amino-di-alkylene phosphonate esters which exhibit, among other things, the unique ability of solubilizing water in water-immiscible solvents.

Other objects of this invention will appear from the description hereinafter.

This invention is directed to new and useful organo-amino-di-alkylenephosphonic acid compounds, as well as the salts and esters thereof, said compounds having the general formula

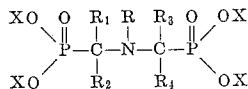

wherein: R is selected from the class consisting of aliphatic hydrocarbyl, alicyclic, aryl, alkaryl, aralkyl and heterocyclic groups of from 4 to 30 carbon atoms; $R_1$, $R_2$, $R_3$ and $R_4$ are selected from the class consisting of hydrogen, aliphatic hydrocarbyl, alicyclic, aryl, alkaryl, aralkyl and heterocyclic groups of from 1 to 30 carbon atoms; and X is selected from the class consisting of cations, alkyl groups of from 1 to 30 carbon atoms, aryl groups, and alkaryl groups. By the term "cations" is meant hydrogen ions, alkali metal cations, alkaline earth metal cations, ammonium ions, or amine ions. For the above-mentioned groups which represent R, $R_1$, $R_2$, $R_3$, $R_4$ and X when it represents alkyl, aryl and alkaryl groups, the OH, COOH, $OCH_3$, halogen, $NO_2$ and $SO_3$ substituted derivatives of the groups are intended to be also included within their meaning. However, for most end use applications the compounds of the instant invention should preferably contain not more than 25 carbon atoms associated with R, $R_1$, $R_2$, $R_3$, $R_4$ and X when it represents alkyl, aryl, and aralkyl groups, and there are few, if any, end uses, in which the foregoing groups contain more than a total of 50 carbon atoms.

These compounds can be characterized quite generally as having a P–C–N–C–P linkage in their molecules and are generically described in this specification by the general terms organo-amino-di-alkylene-phosphonic acids, the salts of organo-amino-di-alkylenephosphonic acids, and the esters of organo-amino-di-alkylenephosphonic acid.

The compounds of the invention can be prepared by various methods with the following methods presented as being representative for their preparation.

The organo-amino-di-alkylenephosphonic acids can be prepared by the reaction of primary amines, a compound containing a carbonyl group, such as an aldehyde or ketone, and orthophosphorus acid. Generally, by heating the mixture above 50° C. at a low pH, preferably around pH 2 or below, the extent of the reaction is usually completed in one to three hours. Another method is the hydrolysis of the ester, i.e., tetraalkyl organo-amino-di-alkylene phosphonate, with concentrated HCl or HBr. Generally by refluxing the ester and acid at reflux temperature for a period usually about three hours is all that is required for the hydrolysis. In the foregoing reactions molar ratios should be used in proportions which will form the desired P—C—N—C—P molecular linkage.

The salts of organo-amino-di-alkylene phosphonic acids can be prepared by neutralization of the acids with a stoichiometric amount of a base that contains essentially the desired cation. Bases such as those containing an alkali metal, alkaline earth, ammonia and amines are especially suited. For example, to make a sodium salt, one of the organo-amino-di-alkylene phosphonic acids can be neutralized with a stoichiometric amount of a base containing the sodium cation, such as NaOH, $Na_2CO_3$ and the like.

The esters of organo-amino-di-alkylene-phosphonic acids can be prepared directly by the reaction of primary amines, a compound containing a carbonyl group, such as an aldehyde or ketone, and a dialkyl phosphonate. Generally by heating the mixture above 50° C. the extent of the reaction is usually completed in about one to three hours. In some cases it as advantageous to form a reaction product of an aldimine or ketimine with a dialkyl phosphonate and still further react the product with a mixture of an aldehyde or ketone and dialkyl phosphonate. This method can result in forming a C-substituted P—C—N—C—P molecular linkage. It should be noted that here also it is necessary to use the correct molar ratios in order to obtain satisfactory yields with the desired P—C—N—C—P molecular linkage.

For the foregoing methods of preparation reaction conditions such as temperature, pH, and time for reaction can be varied with the optimum conditions for the reactions readily ascertained by those skilled in the art. Reference to the specific examples presented hereinafter may be of aid in order to further assist in teaching the methods of their preparation.

The following examples are presented to illustrate the invention, with parts by weight being used in the examples unless indicated otherwise.

*Example I*

Into a conventional jacketed, glass-lined mixing vessel fitted with a water condenser are charged 164 parts of orthophosphorous acid, 102 parts of n-hexylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then, for an additional hour after all of the formaldehyde has been added, the resulting mixture is refluxed at a temperature of about 110° C. after which time the reaction mixture is cooled to room temperature. By nuclear magnetic resonance measurements, it is found that more than 90% of the orthophosphorous acid has been converted to the desired product, hexylaminodi(methylphosphonic acid), $$C_6H_{13}N(CH_2PO(OH)_2)_2$$

The equivalent weight of this product, by titration, is found to be about 96.1, which compares excellently with the calculated value of about 96.3.

*Example II*

Into a mixing vessel similar to that described in Example I, above, are charged 134 parts of cyclohexylamine hydrochloride, 164 parts of orthophosphorous acid and 25 parts of water. The resulting mixture is blended together and heated to 100° C. Then, over a period of about 30 minutes, 66 parts (10% excess) of paraformaldehyde are added slowly thereinto. Then for an additional hour after all of the formaldehyde has been added the resulting mixture is refluxed at a temperature of about 110° C. after which the reaction mixture is cooled to room temperature. By nuclear magnetic resonance measurements, it is found that more than 90% of the orthophosphorous acid has been converted to the desired product, cyclohexylaminodi(methylphosphonic acid), $C_6H_{11}N(CH_2PO(OH_2)_2$. The equivalent weight of this product, by titration, is found to be about 96.6, which compares excellently with the calculated value of about 95.7.

*Example III*

Into a mixing vessel such as that described in Example I, above, are charged 164 parts of orthophosphorous acid, 213 parts of n-tetradecylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all the formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, n-tetradecylamino-di(methylphosphonic acid), $C_{14}H_{29}N(CH_2PO(OH)_2)_2$. The equivalent weight of this product, by titration, is found to be about 137, which compares excellently with the calculated value of about 134.

*Example IV*

Trisodium n - tetradecylaminodi(methylphosphonate), $$C_{14}H_{29}N[CH_2PO(ONa)_2][CH_2PO(ONa)(OH)]$$

is prepared by dissolving 20 grams of free acid obtained in Example III in about 50 ml. of 10% NaOH solution and evaporating the aqueous solution to dryness at about 140° C. with the anhydrous form of the salt being formed.

*Example V*

Into a mixing vessel similar to that described in Example I above, are charged 164 parts of orthophosphorous acid, 266 parts of oleylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, oleylaminodi(methylphosphonic acid), $n-C_{18}H_{35}N(CH_2PO(OH)_2)_2$. The equivalent weight of this product, by titration, is found to be about 158.2, which compares excellently with the calculated value of about 152.5.

*Example VI*

Into a mixing vessel similar to that described in Example I, above, are charged 134 parts of cyclohexylamine hydrochloride, 164 parts of orthophosphorous acid, and 25 parts of water. The resulting mixture is blended together and heated to 100° C. Then, over a period of about 30 minutes, 215 parts of benzaldehyde are slowly poured into the hot mixture. The temperature of the reaction mixture is maintained at about 100° C. for 2 hours, and then cooled to room temperature. Nuclear magnetic resonance analysis of the resulting product indicates that practically all of the orthophosphorous acid has been reacted to form the desired stable P—C—N—C—P linkage. The equivalent weight of the resulting product, cyclohexyl amniodi(benzylidenephosphonic acid), $$C_6H_{11}N(CH(C_6H_5)PO(OH)_2)_2$$

is 114 (theory=109).

*Example VII*

Into a mixing vessel similar to that described in Example I, above, are charged 164 parts of orthophosphorous acid, 108 parts of benzylamine and 75.6 parts of concentrated HCl. The resulting mixture is stirred and heated at 90–100° C. while 120 parts of 37% aqueous formaldehyde solution (100% excess) are added in the course of 30–60 minutes. The solution is then kept at 90–100° C. for about 2 to 3 hours. On cooling to room temperature benzylaminodi(methylphosphonic acid), $$C_6H_5CH_2N(CH_2PO(OH)_2)_2$$

precipitates with a yield of 85.7%. The equivalent weight of this product, by titration, is found to be about 102 which compares with the calculated value of about 98.4.

*Example VIII*

Into a conventional mixing vessel fitted with a reflux condenser are blended 119 parts of α-hydroxy-decylphosphonic acid and 58 parts of decylamine. The mixture is heated at about 110° C. for about 3 hours. The resulting product, decylaminodi(nonylmethylphosphonic acid), $C_{10}H_{21}N[CH(C_9H_{19})PO(OH)_2]_2$, precipitated in the form of its tri(decylammonium) salt upon cooling. The free acid is generated by prolonged grinding of the product in 5 N HCl followed by dilution of boiling water.

*Example IX*

Into a conventional 3-necked, 3-liter flask fitted with a reflux condenser, stirrer and thermometer are charged 102 parts of n-hexylamine, 246 parts of diethyl phosphonate and 180 parts of paraformaldehyde. Upon heating to 70° C. a vigorous reaction is initiated forming the product tetraethyl hexylaminodi(methylphosphonate), $C_6H_{13}N(CH_2PO(OC_2H_5)_2)_2$. The n-m-r spectrum of the product indicates almost complete conversion (≥98%) of the originally present diethylphosphonate to the tetraethyl hexylaminodi(methylphosphonate) by exhibiting a single n-m-r peak at −24.9 p.p.m.

*Example X*

Into a conventional 3-necked, 3-liter flask fitted with a reflux condenser, stirrer and thermometer were charged 426 parts of tetradecylamine, 485 parts of diethyl phosphonate and 325 parts of 36% aqueous formaldehyde solution. The mixture is heated to about 70° C. at which temperature the reaction became exothermic with the temperature rising to about 120° C. The flask is allowed to cool to room temperature and the reaction product extracted with benzene. The solvent was separated from the oily product by distillation. This product, tetraethyl tetradecylaminodi(methylphosphonate), $$C_{14}H_{29}N(CH_2P(O)_3C_2H_5)_2$$

had a n-m-r chemical shift of −24.9 p.p.m. The single n-m-r peak of the product indicates the presence of only one type of phosphorus compound, i.e., tetraethyl tetradecyl aminodi(methylphosphonate).

Example XI

A ketimine is prepared from 182 parts of n-hexylamine and 105 parts of acetone by reacting the acetone with the primary amine in the presence of anhydrous potassium carbonate, separating the ketimine from the aqueous layer and drying thoroughly over potassium hydroxide. This procedure resulted in 231 parts of the ketimine.

Into a reaction vessel similar to that described in Example X are charged the 231 parts of the ketimine and 226 parts of diethyl phosphonate. The mixture is heated to 50° C. at which temperature the reaction is initiated as indicated by the rise in temperature to about 120° C. After cooling to room temperature the resulting product is treated with 50 parts of paraformaldehyde and 225 parts of diethyl phosphonate. This mixture is heated under stirring to about 90° C. at which temperature a vigorous reaction takes place as indicated by the dissolution of the solid paraformaldehyde and an increase of the temperature to 110° C. The resulting product is tetraethyl n-hexyl amino(isopropylidene phosphonate) (methyl phosphonate), $$C H_{13}N[C(CH_3)2PO(OC_2H_5)_2][CH_2PO(OC_2H_5)_2]$$

Example XII

An imine is prepared by reacting 144 parts of butyraldehyde with 214 parts of benzylamine in the presence of anhydrous potassium carbonate, separating the imine product from the aqueous layer and drying over potassium hydroxide. This procedure resulted in a quantity of 308 parts of the imine.

Into a reaction vessel similar to that described in Example X are charged 260 parts of diethyl phosphonate and 308 parts of imine. The mixture is heated to about 50° C. to initiate the reaction. After cooling to room temperature the resulting product is further reacted with 60 parts of paraformaldehyde and 260 parts of diethyl phosphonate by heating to about 90° C. under stirring, at which temperature a vigorous reaction occurs with the desired product, tetraethyl benzylamino(butylidene phosphonate) (methyl phosphonate), $$C_6H_5CH_2N[CH(C_3H_7)PO(OC_2H_5)_2][CH_2PO(OC_2H_5)_2]$$

being formed.

Compounds representative of the instant invention which can be prepared by methods such as those described in the foregoing examples are:

(1) Long chain aliphatic hydrocarbyl-amino-dialkylene phosphorus compounds, such as $C_4H_9N(CH_2P(O)(OH)_2)_2$
n-Butyl-amino-di(methyl phosphonic acid)
$C_{10}H_{21}N(CH_2PO(OC_2H_5)_2)_2$
Tetraethyl-decyl-amino-di(methyl phosphonate)
$C_{15}H_{31}N[(CH_2PO(ONa)(OH)][CH_2PO(ONa)_2]$
Trisodium-pentadecyl-amino-di(methyl phosphonate)
$C_5H_7N(CH_2PO(OH)_2)_2$
3,5-pentadiene-amino-di(methyl phosphonic acid)
$C_5H_9N(CH_2PO(OH)_2)_2$
5-hexyne-amino-di(methyl phosphonic acid)
$C_9H_{15}N(CH_2PO(OC_2H_5)_2)_2$
Tetraethyl-8-nonyne amino-di(methyl phosphonate)
$C_{12}H_{21}N(CH_2PO(OH)_2)_2$
11-dodecene-amino-di(methyl phosphonic acid)
$(HOOC)C_3H_6N(CH_2PO(OH)_2)_2$
3-carboxy-propyl-amino-di(methyl phosphonic acid)
$OHC_{12}H_{24}N(CH_2PO(OC_2H_5)_2)_2$
Tetraethyl-12-hydroxy-dodecane-amino-di(methyl phosphonate)
$C_5H_9N(CH_2PO(OH)_2)_2$
5-pentene-amino-di-(methyl phosphonic acid)
$C_4H_9N(C(C_6H_5)HP(O)(OH)_2)_2$
n-Butyl-amino-di(benzylidene phosphonic acid)
$(OH)C_{12}H_{24}N(C(C_9H_{19})HP(O)(OH)_2)_2$
12-hydroxy-dodecane-amino-di(nonyl methyl phosphonic acid)
$C_{12}H_{25}N[C(CH_3)_2PO(OH)_2][CH_2PO(OH)_2]$
Dodecyl-amino(isopropylidene phosphonic acid)(methyl phosphonic acid)
$C_{10}H_{21}N[C(C_6H_{11})HPO(OH)_2][CH_2PO(OH)_2]$
Decyl-amino(cyclohexyl methyl phosphonic acid) (methyl phosphonic acid)
$C_{12}H_{25}N[C(C_{10}H_7)HPO(OH)_2][CH_2PO(OH)_2]$
Dodecyl-amino (1-naphthyl methyl phosphonic acid) methyl phosphonic acid)
$nC_4H_9N(CH_2P(O)(O_2Ca)_2)_2$
Dicalcium-n-butyl-amino-di(methyl phosphonate)
$C_{12}H_{25}N[CH_2PO(ON(CH_3)_4)_2][CH_2PO(ON(CH_3)_4)(OH)]$
Tri-tetramethyl ammonium-dodecyl-amino-di-(methyl phosphonate)
$C_{12}H_{25}N[CH_2PO(O·NH_3CH_2CH_2OH)_2][CH_2PO(O·NH_3CH_2CH_2OH)(OH)]$
Tri-ethanol ammonium-dodecyl-amino-di(methyl phosphonate)
$C_{14}H_{29}N[CH_2PO(ONH_4)_2][CH_2PO(ONH_4)(OH)]$
Tri-ammonium tetradecyl-amino-di(methyl phosphonate)
$C_6H_{13}N(CH_2PO(OCH_2C_6H_5)_2)_2$
Tetrabenzyl-n-hexyl-amino-di(methyl phosphonate)
$C_6H_{13}N(CH_2PO(OCH_2CH_2C_6H_5)_2)_2$
Tetraphenylethyl-n-hexyl-amino-di(methyl phosphonate)

(2) Monocycle, alicyclic-amino-di-alkylene phosphorus compounds, such as $C_4H_7N(CH_2PO(OH)_2)_2$
Cyclobutyl-amino-di(methyl phosphonic acid)
$OHC_6H_{10}N(CH_2PO(OH)_2)_2$
2-hydroxy-cyclohexyl-amino-di(methylphosphonic acid)
$C_5H_9N(CH_2PO(OH)_2)_2$
Cyclopentyl-amino-di(methyl phosphonic acid)
$C_5H_9N(C(CH_3)_2PO(OH)_2)_2$
Cyclopentyl-amino-di(isopropylidene phosphonic acid)
$C_6H_{11}N(CH_2PO(OC_6H_5)_2)_2$
Tetraphenyl-cyclohexyl-amino-di(methyl phosphonate)

(3) Monocyclic, aryl-amino-di-alkylene phosphorus compounds, such as $C_6H_5N(CH_2PO(OH)_2)_2$
Phenyl-amino-di(methyl phosphonic acid)
$C_6H_5N[C(CH_3)_2PO(OH)_2][CH_2PO(OH)_2]$
Phenyl-amino(isopropylidene phosphonic acid) (methyl phosphonic acid)
$(NO_2)_2C_6H_3N(CH_2PO(OH)_2)_2$
2,4-dinitro-phenyl-amino-di(methyl phosphonic acid)
$COOH(C_6H_4)N(CH_2PO(OH)_2)_2$
4-carboxy-phenyl-amino-di(methyl phosphonic acid)
$(Cl)_2(OH)C_6H_2N(CH_2PO(OH)_2)_2$
3,5-dichloro-6-hydroxy-phenyl-amino-di-(methyl phosphonic acid)
$(OH)C_6H_4N(CH_2PO(OH)_2)_2$
4-hydroxy-phenyl-amino-di(methyl phosphonic acid)
$(NO_2)(OCH_3)C_6H_3N(CH_2PO(OH)_2)_2$
3-nitro-4-methoxy-phenyl-amino-di(methyl phosphonic acid)
$C_6H_5N(CH_2PO(OC_6H_{11})_2)_2$
Tetrahexyl-phenyl-amino-di(methyl phosphonate)
$C_6H_5N(CH_2PO(OC_{12}H_{23})_2)_2$
Tetra-11-dodecene-phenyl-amino-di(methyl phosphonate)

(4) Dicyclic, aryl-amino-di-alkylene phosphorus compounds, such as $Cl(C_6H_4)(C_6H_4)N(CH_2PO(OH)_2)_2$ 4'-chloro-4-N-diphenyl-amino-di(methyl phosphonic acid)
(OH)C$_{10}$H$_6$N(CH$_2$PO(OH)$_2$)$_2$
4-hydroxy-naphthyl-1-amino-di(methyl phosphonic acid)
(OH)(SO$_3$H)C$_{10}$H$_5$N(CH$_2$PO(OH)$_2$)$_2$
1-sulfo-3-hydroxy-naphthyl-1-amino-di(methyl phosphonic acid)

(5) Monocyclic, alkaryl-amino-di-alkylene phosphorus compounds, such as (CH$_3$)C$_6$H$_4$N(CH$_2$PO(OH)$_2$)$_2$
p-Methyl-phenyl-amino-di(methyl phosphonic acid)
(CH$_3$)$_2$C$_6$H$_3$N(CH$_2$PO(OH)$_2$)$_2$
Xylyl-amino-di(methyl phosphonic acid)
(CH$_3$)C$_6$H$_4$N(CH$_2$PO(OC$_2$H$_5$)$_2$)$_2$
Tetra ethyl p-methyl-phenyl-amino-di(methyl phosphonate)
(CH$_3$)$_2$C$_6$H$_3$N(CH$_2$PO(ONa)$_2$)[CH$_2$PO(ONa)(OH)]
Trisodium xylyl-amino-di(methyl phosphonate)
C$_{12}$H$_{25}$(C$_6$H$_4$)N(CH$_2$PO(OH)$_2$)$_2$
Dodecyl-phenyl-amino-di(methyl phosphonic acid)
(CH$_3$)$_4$C$_6$HN(CH$_2$PO(OH)$_2$)$_2$
Durylene-amino-di(methyl phosphonic acid)

(6) Dicyclic, alkaryl-amino-di-alkylene phosphorus compounds, such as (CH$_3$)C$_{10}$H$_7$N(CH$_2$PO(OH)$_2$)$_2$
5-methyl-naphthyl-2-amino-di(methyl phosphonic acid)
(CH$_3$)(OH)C$_{10}$H$_6$N(CH$_2$PO(OH)$_2$)$_2$
2-methyl-1-hydroxy-4-naphthyl-amino-di(methyl phosphonic acid)
(C$_{12}$H$_{25}$)C$_{10}$H$_6$N(CH$_2$PO(OH)$_2$)$_2$
7'-dodecyl-naphthyl-2-amino-di(methyl phosphonic acid)

(7) Monocyclic, aralkyl-amino-di-alkylene phosphorus compounds, such as

C$_6$H$_5$CH$_2$CH$_2$N(CH$_2$PO(OH)$_2$)$_2$
Phenylethyl-amino-di(methyl phosphonic acid)
C$_6$H$_5$CH$_2$CH$_2$CH$_2$N(CH$_2$PO(OH)$_2$)$_2$
Phenylpropyl-amino-di(methyl phosphonic acid)
C$_6$H$_5$CH$_2$N[C(C$_5$NH$_4$)HPO(OH)$_2$][CH$_2$PO(OH)$_2$]
Phenylmethyl-amino(2-pyridyl methyl phosphonic acid) (methyl phosphonic acid)
C$_6$H$_5$CH$_2$CH$_2$N(CH$_2$PO(O$_2$Ca)$_2$)
Dicalcium-phenylethyl-amino-di(methyl phosphonate)

(8) Monocyclic, N-containing heterocyclic-amino-di-alkylene phosphorus compounds, such as, C$_5$NH$_4$N(CH$_2$PO(OH)$_2$)$_2$
2-N-pyridyl-amino-di(methyl phosphonic acid)
(CH$_3$)C$_5$NH$_3$N(CH$_2$PO(OH)$_2$)$_2$
4-methyl-pyridyl-2-amino-di(methyl phosphonic acid)

(9) Monocyclic, S-containing heterocyclic-amino-di-alkylene phosphorus compounds, such as C$_3$SNH$_2$N(CH$_2$PO(OH)$_2$)$_2$
2-thiazylamino-di(methyl phosphonic acid)
(NO$_2$)C$_3$SNH$_2$N(CH$_2$PO(OH)$_2$)$_2$
5-nitro-2-thiazyl amino-di(methyl phosphonic acid)

Quite unexpectedly organo-amino-di-alkylene phosphonic acids or the salts thereof were found to exhibit not only good deflocculating or dispersing properties but also good surfactancy properties. It is highly unusual for both of these properties to be effectively exhibited by the same compound. As can be appreciated, such compounds can advantageously be utilized in applications which can use the foregoing properties, such as, detergent compositions. In many detergent applications such as textile washing and hard surface cleaning, the ability of the detergent composition to remove the soil and keep the soil suspended in the washing medium is of paramount importance.

The long chain hydrocarbyl-amino-di-lower alkylene phosphonic acids or the salts thereof are preferred in applications which use the combined surfactancy and deflocculating properties. These compounds are of the following formula:

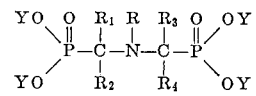

wherein: R is selected from the class consisting of saturated and ethylenically unsaturated aliphatic hydrocarbyl radicals containing from 4 to 20 carbon atoms; $R_1$, $R_2$, $R_3$ and $R_4$ are selected from the class consisting of hydrogen and lower alkyl groups (1 to 4 carbon atoms); and Y is a cation. By the term "cation" is meant a hydrogen ion, alkali, metal cation, alkaline earth metal cation, ammonium ion, or an amine ion.

As used in detergent compositions, the compounds of the instant invention are preferably formulated with other components, i.e., builders such as sodium tripolyphosphate, anti-redeposition agents such as carboxymethyl cellulose, brightening agents and the like, in amounts between about 10% to 50% by weight of the detergent composition.

Compounds illustrative of the invention were tested for surfactancy properties by determining surface tension measurements with a du Nuoy Tensiometer in distilled water at room temperature. The compounds tested were at concentrations believed representative of detergent concentrations used in actual applications. The results of the test are tabulated below.

TABLE 1

| Compound | Surface Tension (dyne/cm.) at indicated molar concentrations | |
|---|---|---|
| | $5 \times 10^{-4}$ | $10^{-3}$ |
| (1) Trisodium methyl-amino-dimethylphosphonate CH$_3$N(CH$_2$PO(ONa)$_2$)(CH$_2$PO(ONa)(OH)) | 72 | 60 |
| (2) Trisodium hexyl-amino-di-methyl-phosphonate C$_6$H$_{13}$N(CH$_2$PO(ONa)$_2$)(CH$_2$PO(ONa)(OH)) | 62 | 64 |
| (3) Trisodium cyclo-hexyl-amino-dimethylphosphonate (C$_6$H$_{13}$)N(CH$_2$PO(ONa)$_2$)CH$_2$PO(ONa)(OH)) | 61 | 61 |
| (4) Trisodium octyl-amino-di-methyl-phosphonate C$_8$H$_{17}$N(CH$_2$PO(ONa)$_2$)CH$_2$O(ONa)(OH)) | 56 | 44 |
| (5) Trisodium decyl-amino-di-methyl-phosphonate C$_{10}$H$_{21}$N(CH$_2$PO(ONa)$_2$)(CH$_2$O(ONa)(OH)) | 44 | 40 |
| (6) Trisodium dodecyl-amino-di-methyl-phosphonate C$_{12}$H$_{25}$N(CH$_2$PO(ONa)$_2$)(CH$_2$PO(ONa)(OH)) | 44 | 39 |
| (7) Trisodium tetradecyl-amino-di-methyl-phosphonate C$_{14}$H$_{29}$N(CH$_2$PO(ONa)$_2$)(CH$_2$PO(ONa)(OH)) | 44 | 38 |
| (8) Trisodium hexadecyl-amino-dimethyl-phosphonate C$_{16}$H$_{33}$N(CH$_2$PO(ONa)$_2$)(CH$_2$PO(ONa)(OH)) | 36 | 34 |
| (9) Trisodium oleyl-amino-di-methyl-phosphonate C$_{18}$H$_{35}$N(CH$_2$PO(ONa)$_2$)(CH$_2$PO(ONa)(OH)) | 44 | 44 |
| (10) Water | 72 | 72 |
| (11) Sodium dodecylbenzene sulfonate | 35 | 37 |

As can be observed from the above table compounds illustrative of the invention, i.e., (2), (3), (4), (5), (6), (7), (8), and (9) all exhibit the ability to lower the surface tension of water (10). Compounds (5), (6), (7), and (8) all compared very favorably with sodium dodecyl-benzene sulfonate (11) a widely used surfactant. It should be noted that compound (1) exhibited no appreciable ability to lower the surface tension of water. As can be appreciated, therefore, by reason of their surfactancy compounds of this invention are particularly well suited for use in detergent compositions.

Compounds illustrative of the invention were tested for deflocculating properties in a carefully controlled kaolin slurry. The kaolin used in the evaluation was essentially free of impurities and was placed in an aqueous slurry with a solids content about 68%. The slurry throughout the evaluation was maintained at a pH of about 7 with NaOH. The apparent viscosity was determined with a Stormer Viscometer at 300 r.p.m. The results of the tests are tabulated below.

fore, the foregoing mentioned applications are merely indicative of their use.

The esters of long chain hydrocarbyl-amino-di-lower alkylene phosphonic acids are preferred in applications which use the combined surfactancy and/or water solubilizing properties. These compounds are of the following formula:

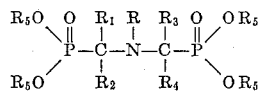

wherein: R is selected from the class consisting of saturated and ethylenically unsaturated aliphatic hydrocarbyl radicals containing from 4 to 20 carbon atoms; $R_1$, $R_2$, $R_3$ and $R_4$ are selected from the group consisting of hydrogen and lower alkyl groups (1 to 4 carbon atoms); and $R_5$ is selected from the class consisting of alkyl groups of from 1 to 20 carbon atoms, aryl groups and alkylaryl groups.

Because of the complexity of the ternary solubility

TABLE 2

| Compound | Apparent Viscosity (cp.) at 300 v.p.m. Stormer at indicated weight percent of deflocculated on a dry clay basis | | | |
|---|---|---|---|---|
| | 0 | .1 | .15 | .2 |
| (1) Trisodium methyl amino-di-methyl-phosphonate $CH_3N[CH_2PO(ONa)_2][CH_2PO(ONa)(OH)_2]$ | Plastic | 180 | 180 | 180 |
| (2) Trisodium butyl amino-di-methyl-phsophonate $C_4H_9N[CH_2PO(ONa)_2][CH_2PO(ONa)(OH)_2]$ | do | 220 | 210 | 200 |
| (3) Trisodium cyclohexylamino-di-methyl-phosphonate $(C_6H_{13})N[CH_2PO(ONa)_2][CH_2PO(ONa)(OH)_2]$ | do | 220 | 210 | 200 |
| (4) Trisodium octyl-amino-di-methyl-phosphonate $C_8H_{17}N[CH_2PO(ONa)_2][CH_2PO(ONa)(OH)_2]$ | do | 180 | 180 | 200 |
| (5) Trisodium tetradecyl-amino-di-methyl-phosphonate $C_{14}H_{29}N[CH_2PO(ONa)_2][CH_2PO(ONa)(OH)_2]$ | do | 380 | 370 | 390 |
| (6) Trisodium oleyl amino-di-methylphosphonate $C_{18}H_{35}N[CH_2PO(ONa)_2][CH_2PO(ONa)(OH)_2]$ | do | 1,400 | 1,000 | 1,100 |
| (7) Sodium tripolyphosphate | do | 180 | 180 | 180 |

As can be observed from the above table, minor amounts of the compounds illustrative of the invention, i.e., (2), (3), (4), (5) and (6), deflocculated a plastic slurry into a flowable slurry. In addition, compounds (2), (3) and (4) compared very favorably with sodium tripolyphosphate (7), a widely used deflocculant, and compound (1).

The esters of organo-amino-di-alkylene phosphonic acids were found not only to be completely miscible with water but also highly soluble in organic solvents, such as hydrocarbon solvent, i.e., hexane and pentane, carbon tetra chloride, haloethylene solvents, i.e., perchloroethylene, ethers, alcohols, and the like. Also, the esters were found to impart a solubilizing action to water in water-immiscible solvents, such as many of the previously mentioned solvents. This totally unexpected property render them highly useful as gasoline de-icer additives and along with their surfactancy properties render them useful as dry cleaning detergents. As can be appreciated, however, the unique ability to impart a solubilizing action to water in water-immiscible solvents can be utilized in many and varied applications and therediagram of the esters of the instant invention-water-water- immiscible solvents the following is set forth for example purposes only.

A. A solution of equal volumes of tetraethyl tetradecylamino-di-methylphosphonate, $$C_{12}H_{25}N(CH_2PO(OC_2H_5)_2)_2$$

and water were found to completely dissolve one volume of hexane.

B. A solution of equal volumes of tetraethyl iso-isobutyl amino-di-methylphosphonate, $$iso-C_4H_9N(CH_2PO(OC_2H_5)_2)_2$$

and water were found to completely dissolve one-half a volume of hexane.

C. A solution of 50 cc. of hexane and 3 grams of the following esters of the long chain alkyl-amino-di-methyl-phosphonic acids dissolved the amounts of water at room temperature indicated in Table 3. The water was added dropwise until permanent cloudiness or phase separation was observed. The tabulated results are presented in the following table.

TABLE 3

| Compound | H₂O Added (grams) |
|---|---|
| (1) Tetraethyl hexadecylamino-di-methylphosphonate $C_{16}H_{33}N(CH_2PO(OC_2H_5)_2)_2$ | 3. |
| (2) Tetraethyl tetradecyl amino-di-methylphosphonate $C_{12}H_{25}N(CH_2PO)(OC_2H_5)_2)_2$ | 1. |
| (3) Tetraethyl, octylamino-di-methylphosphonate $C_8H_{17}N(CH_2PO(OC_2H_5)_2)_2$ | .7. |
| (4) Tetraethyl iso-butyl amino-di-methylphosphonate $iso-C_4H_9N(CH_2PO(OC_2H_5)_2)_2$ | Several drops. |

It should be noted that the foregoing example solutions exhibited no phase separation at the end of a one-week period of standing nor was there a phase separation after the solutions had been centrifuged at 5,000 r.p.m. for one hour indicating that the water was completely dissolved in the water-immiscible solvent. It should further be noted that tetraethyl methyl amino-dimethyl phosphonate, $CH_3N(CH_2PO(OC_2H_5)_2)_2$, did not impart a solubilizing action to water in a water-immiscible solvent.

As previously mentioned the ester compounds of the instant invention are useful in gasoline de-icer additives and are preferably used in amounts of from .005 to .1% by weight. An advantageous feature of these de-icer additives, by reason of their phosphorus content, is their ability to function either wholly as the primary additive for surface ignition control or in conjunction with other known phosphorus additives for surface ignition control.

As dry cleaning additives the ester compounds of the instant invention can be used as either the primary surfactant or in conjunction with other surfactants. When used as substantially the primary surfactant with many of the common organic solvents, such as, Stoddard's solvent and perchloroethylene, amounts within the range of .05% to 4% by weight are usually sufficient with amounts about 2% by weight being preferred.

Although the compounds of the instant invention as well as their uses have been described with a degree of particularity, the invention herein is intended to be limited only by the claims set-forth hereinafter.

What is claimed is:

1. An ester of an organo-amino-di-alkylene phosphonic acid, said ester having the formula

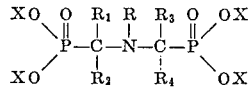

wherein R is selected from a class consisting of aliphatic hydrocarbyl groups containing from 4 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; $R_1$, $R_2$, $R_3$ and $R_4$ are selected from the class consisting of hydrogen, aliphatic hydrocarbyl groups containing from 1 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; and X is selected from the group consisting of alkyl groups from 1 to 30 carbon atoms, phenyl, benzyl and phenylethyl.

2. An ester of a long-chain hydrocarbyl-amino-di-lower alkylene phosphonic acid, said ester having the formula

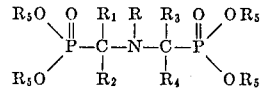

wherein R is selected from the class consisting of saturated and ethylenically unsaturated aliphatic hydrocarbyl radicals containing from 4 to 20 carbon atoms; $R_1$, $R_2$, $R_3$ and $R_4$ have the structure $C_xH_{2x+1}$ wherein $x$ is an integer from 0 to 4 inclusive; and $R_5$ is selected from the group consisting of alkyl groups of from 1 to 20 carbon atoms.

3. An ester of a long-chain hydrocarbyl-amino-dimethyl phosphonic acid having the formula

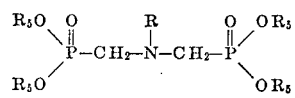

wherein R is selected from the class consisting of saturated and ethylenically unsaturated aliphatic hydrocarbyl radicals containing from 4 to 20 carbon atoms and $R_5$ is selected from the group consisting of alkyl groups of from 1 to 20 carbon atoms.

4. Tetraethyl octylamino di(methylphosphonate).
5. Tetraethyl decylamino di(methylphosphonate).
6. Tetraethyl tetradecyl amino di(methylphosphonate).
7. Tetraethylhexylamino di(methylphosphonate).

References Cited by the Examiner

UNITED STATES PATENTS

| | | | |
|---|---|---|---|
| 2,652,426 | 9/1953 | Stayner | 260—500 |
| 2,750,343 | 6/1956 | Beber | 252—153 |
| 2,874,184 | 2/1959 | Van Winkle et al. | 260—500 |
| 2,943,058 | 6/1960 | Cook | 252—153 |
| 3,049,414 | 8/1962 | Kruyff | 44—63 |
| 3,068,082 | 12/1962 | Paris et al. | 44—63 |

CHARLES B. PARKER, *Primary Examiner.*

JULIUS GREENWALD, A. T. MEYERS, R. L. RAYMOND, *Assistant Examiners.*